(12) United States Patent
Tu

(10) Patent No.: US 9,395,769 B2
(45) Date of Patent: Jul. 19, 2016

(54) HARD DISK DRIVE TRAY

(71) Applicant: BLUEBAY ELECTRONIC CORPORATION, Taipei (TW)

(72) Inventor: I-Hung Tu, Taipei (TW)

(73) Assignee: BLUEBAY ELECTRONIC CORPORATION, Taipei (TW)

( * ) Notice: Subject to any disclaimer, the term of this patent is extended or adjusted under 35 U.S.C. 154(b) by 0 days.

(21) Appl. No.: 14/659,034

(22) Filed: Mar. 16, 2015

(65) Prior Publication Data

US 2015/0268703 A1 Sep. 24, 2015

(30) Foreign Application Priority Data

Mar. 21, 2014 (TW) .............................. 103204903 U

(51) Int. Cl.
*H05K 7/00* (2006.01)
*H05K 5/00* (2006.01)
*G06F 1/18* (2006.01)
*G11B 33/12* (2006.01)

(52) U.S. Cl.
CPC .............. *G06F 1/187* (2013.01); *G11B 33/124* (2013.01)

(58) Field of Classification Search
CPC .............................. G06F 1/187; G06F 7/0043

USPC ..................................................... 361/679.52
See application file for complete search history.

(56) References Cited

U.S. PATENT DOCUMENTS

| 5,499,925 A * | 3/1996 | Lwee ..................... G06K 13/08 439/155 |
| 6,042,401 A * | 3/2000 | Oguchi ................ G06K 7/0021 439/159 |
| 6,210,188 B1 * | 4/2001 | Chang .................... G06K 13/08 439/159 |
| 7,430,115 B2 * | 9/2008 | Liu ......................... G06F 1/187 312/223.2 |

FOREIGN PATENT DOCUMENTS

TW M401843 U 4/2011

* cited by examiner

*Primary Examiner* — Jerry Wu
(74) *Attorney, Agent, or Firm* — patenttm.us

(57) ABSTRACT

A hard disk drive tray has a casing, a lid, two pivotal arms, and a first lever. The casing has a bottom board, a side, an open end, a closed end, and a rail channel. The rail channel is defined through the bottom board. The lid is pivotally connected with the casing by the pivotal arms and has a resilient member. The resilient member is mounted on a side of the lid and abuts with the hard disk drive when the open end is closed by the lid. The first lever has a first end and a second end. The first end is pivotally connected with one of the pivotal arms. The second end of the first lever is provided with a pushing block that is mounted slidably through the rail channel.

11 Claims, 7 Drawing Sheets

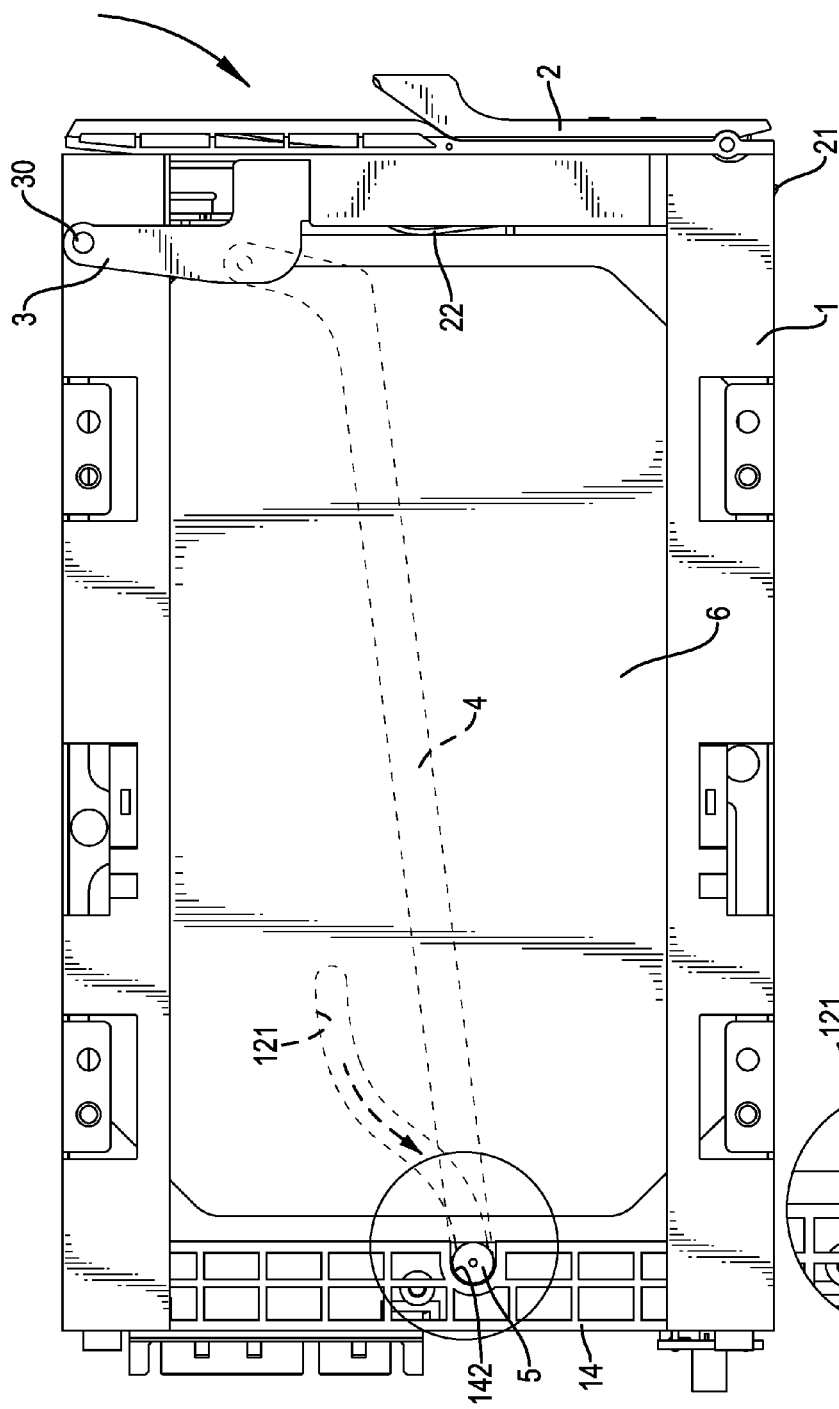
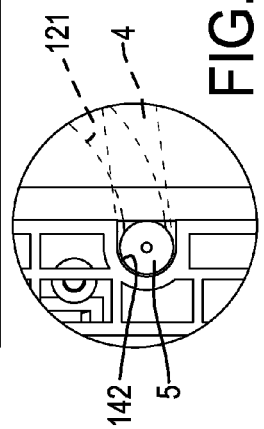
FIG.4
FIG.4A

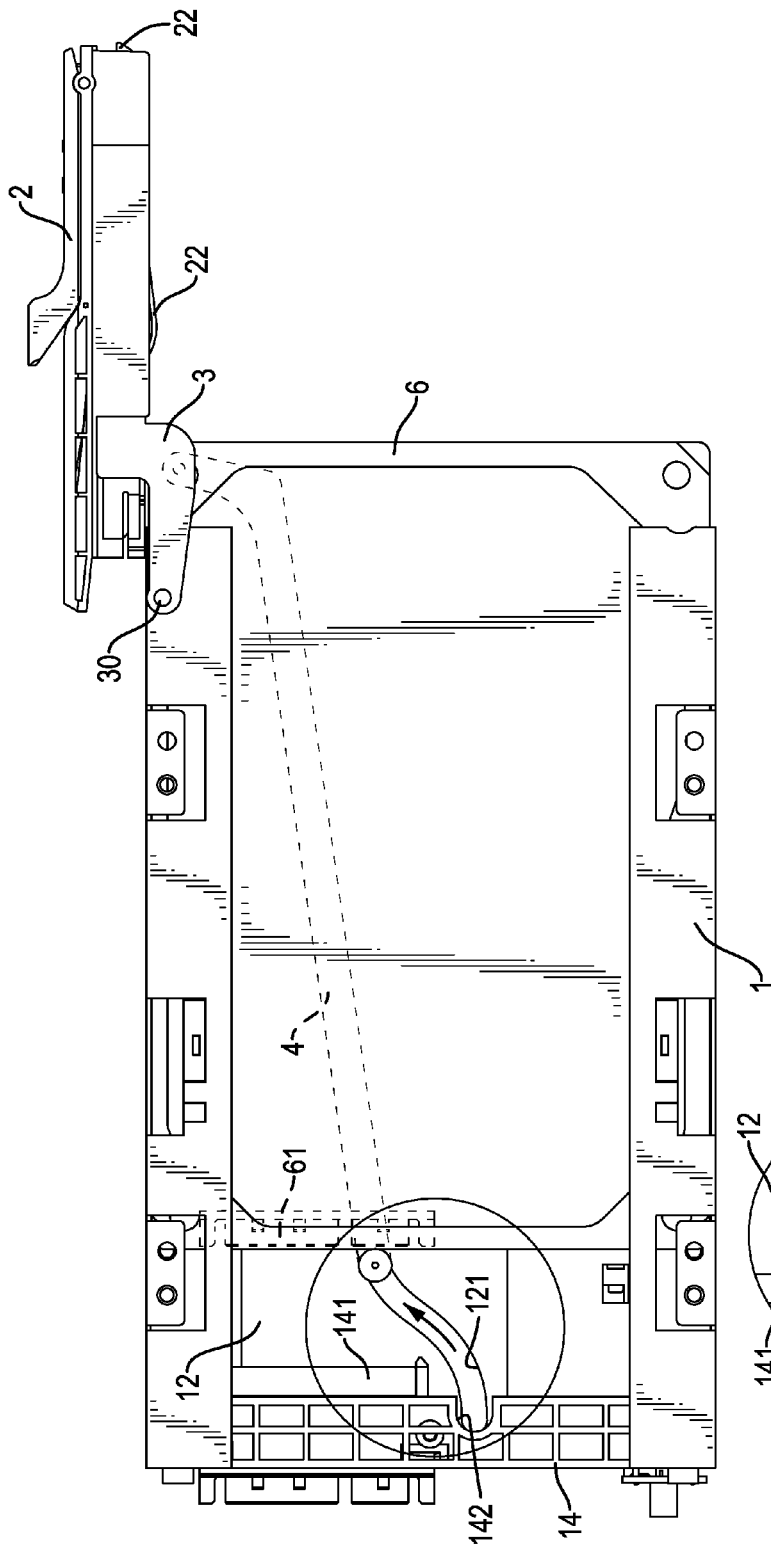
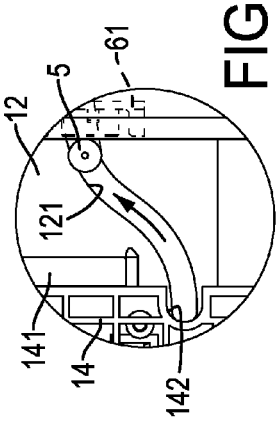

HARD DISK DRIVE TRAY

BACKGROUND OF THE INVENTION

1. Field of the Invention

The present invention relates to a hard disk drive tray, and more particularly to a hard disk drive tray that can automatically push a hard disk drive out of an opening of the drive tray when a lid is opened.

2. Description of Related Art

A conventional hard disk drive tray is applied to hold a hard disk drive (HDD) inside to mount the hard disk drive inside a computer case. However, to remove the hard disk drive from the computer case, the computer case has to be opened or disassembled. Thus, to remove the hard disk drive from a computer case is inconvenient.

Another hard disk drive tray is then provided to allow the hard disk drive to be drawn from the hard disk drive tray directly without disassembling the computer case. However, the conventional hard disk drive tray has a complicated structure and is laborious in assembling onto the computer case.

Furthermore, TW Utility Model No. M401843, entitled to "Removable Hard Disk Drive tray" discloses a hard disk drive tray having a swinging lever and a linkage lever. One of two ends of the swinging lever is pivotally connected to a closed end of a casing, and the other end of the swinging lever is pivotally connected with one of two ends of the linkage lever. The other end of the linkage lever is pivotally connected with a pivotal tab on a lid. A lateral recess is formed in the closed end of the casing for holding the swinging lever inside. When the lid is opened and pivoted, the hard disk drive will be pushed out of the casing by the swinging lever with the transmission of the linkage lever and the pivotal tab.

However, the swinging lever of the '843 patent will not actually enter into the lateral recess because the swinging lever may incline due to the gravity. In addition, the travel of the swinging lever and the linkage lever is too long to cause shake of the levers. The conventional hard disk drive tray of the '843 patent also has a complicated structure and is laborious in assembling.

To overcome the shortcomings, the present invention tends to provide a hard disk drive tray to mitigate or obviate the aforementioned problems.

SUMMARY OF THE INVENTION

The main objective of the invention is to provide a hard disk drive tray that has a simplified structure and is time-saving in assembling.

The hard disk drive tray has a casing, a lid, two pivotal arms, and a first lever. The casing can hold a hard disk drive inside and has a bottom board, a side, an open end, a closed end opposite the open end, a recess, a locking hole, a socket, and a rail channel. The recess is defined in the closed end at a side facing the open end. The locking hole is defined in the side of the casing at a position near the open end. The socket is mounted on the closed end for being connected with a plug on the hard disk drive. The rail channel is defined through the bottom board and has an end communicating with the recess. The lid is pivotally connected with and closing the open end of the casing and has a locking member and a resilient member. The locking member is mounted on the lid and selectively engages with the locking hole in the casing. The resilient member is mounted on a side of the lid and abuts with the hard disk drive when the open end is closed by the lid. The pivotal arms are bent and are connected respectively with a top and a bottom of the lid. Each pivotal arm has a first end securely connected with the lid and a second end pivotally connected with the casing. The first lever is mounted below the bottom board of the casing and has a first end and a second end. The first end is pivotally connected with the pivotal arm that is connected to the bottom of the lid. The second end of the first lever is provided with a pushing block that is mounted slidably through the rail channel, extends inside the casing, and is selectively held in the recess in the casing.

Other objects, advantages and novel features of the invention will become more apparent from the following detailed description when taken in conjunction with the accompanying drawings.

BRIEF DESCRIPTION OF THE DRAWINGS

FIG. 3A is an enlarged cross sectional top view of the hard disk drive tray in FIG. 1;

FIG. 4 is an operational top view of the hard disk drive tray in FIG. 1;

FIG. 4A is an enlarged top view of the hard disk drive tray in FIG. 4;

FIG. 5 is an operational top view of the hard disk drive tray in FIG. 1 showing that the lid is opened;

FIG. 5A is an enlarged top view of the hard disk drive tray in FIG. 5;

DETAILED DESCRIPTION OF PREFERRED EMBODIMENT

Figure 1:
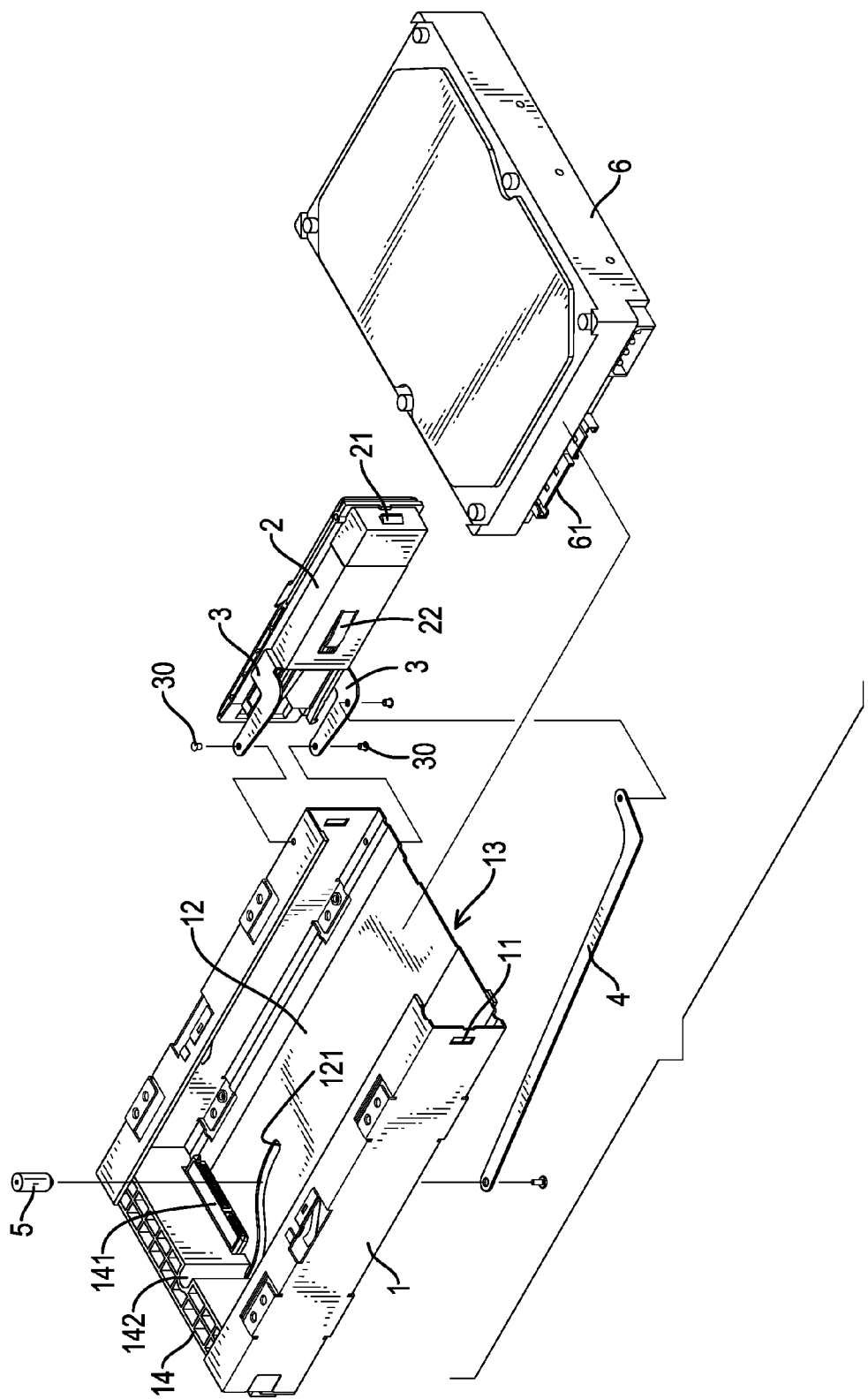
FIG. 1 is an exploded perspective view of a hard disk drive and a first embodiment of a hard disk drive tray in accordance with the present invention.
Figure 2:
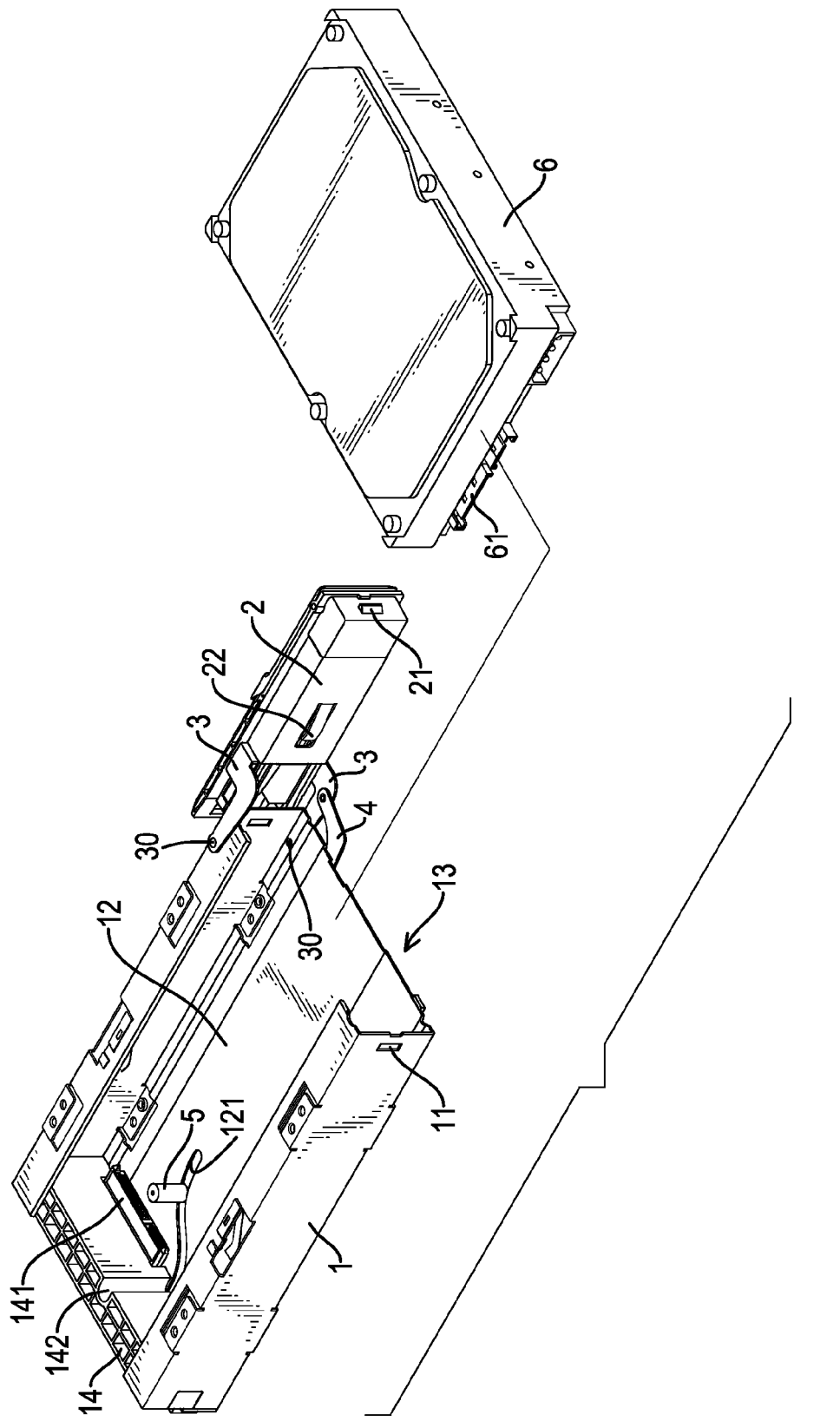
FIG. 2 is an exploded view of the hard disk drive and the hard disk drive tray in FIG. 1.
Figure 3:
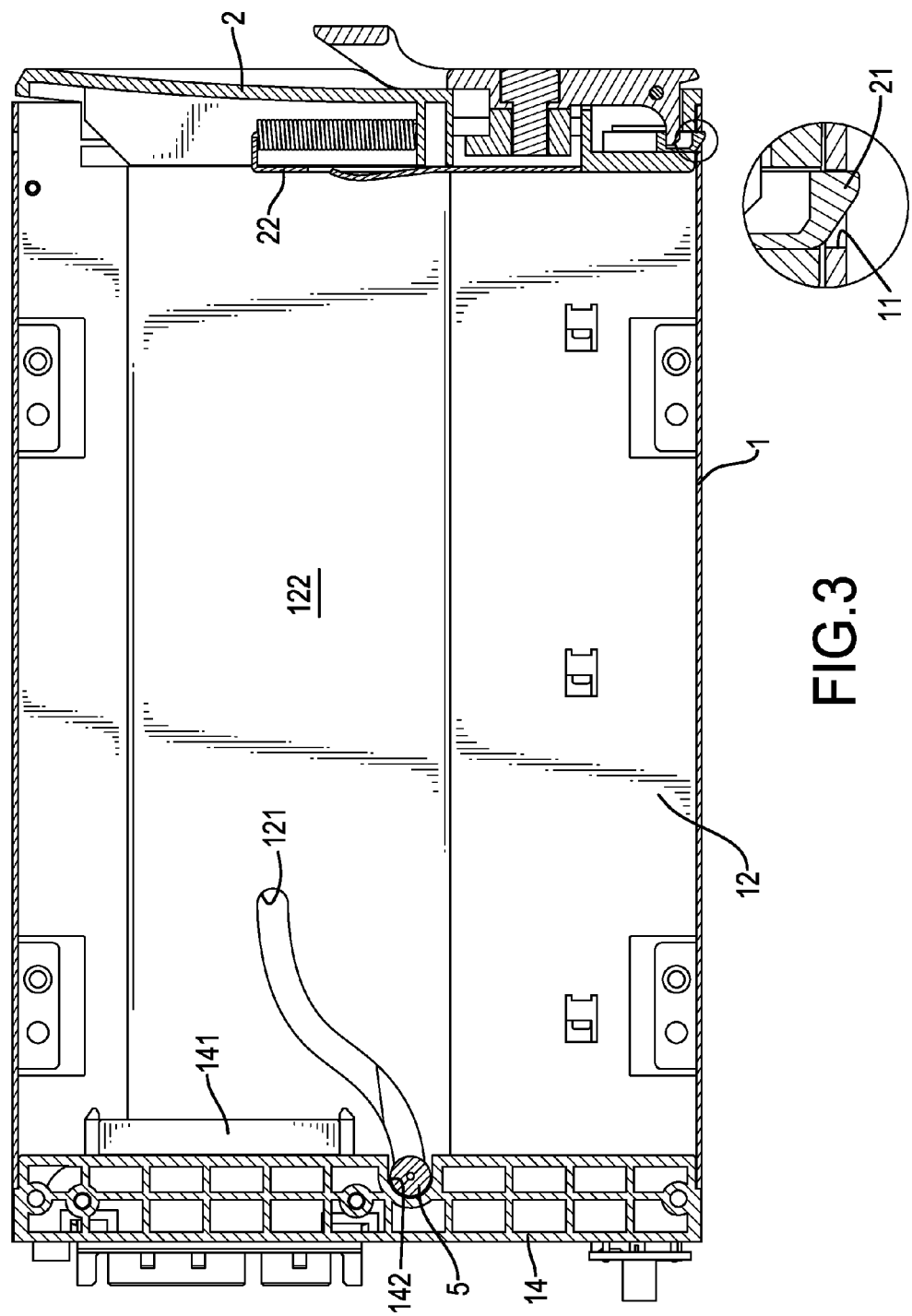
FIG. 3 is a top view in partial section of the hard disk drive tray in FIG. 1.

With reference to FIGS. 1 to 4A, a hard disk drive tray in accordance with the present invention is applied to hold a hard disk drive 6 inside and comprises a casing 1, a lid 2, two pivotal arms 3, and a first lever 4.

The casing 1 is applied to hold a hard disk drive inside and comprises a bottom board 12, a side, an open end 13, a closed end 14, a recess 142, a locking hole 11, a socket 141, and a rail channel 121. The closed end 14 is opposite the open end 13. The recess 142 is defined in the closed end 14 at a side facing the open end 13. The locking hole 11 is defined in the side of the casing 1 at a position near the open end 13. The socket 141 is mounted on the closed end 14 for being connected with a plug 61 on the hard disk drive 6. The rail channel 121 is defined through the bottom board 12 and has an end communicating with the recess 142. In addition, the rail channel 121 extends from the closed end 14 of the casing 1 toward a middle segment 122 of the bottom board 12. Preferably, the rail channel 121 may be curved, straight, S-shaped, or in possible geometrical shape.

The lid 2 is pivotally connected with and closes the open end 13 of the casing 1 and has a locking member 21 and a resilient member 22. The locking member 21 is mounted on the lid 2 and selectively engages with the locking hole 11 in the casing 1. The resilient member 22 is mounted on a side of the lid 2 and abuts with the hard disk drive 6 when the open end 13 is closed by the lid 2.

The pivotal arms 3 are bent and are connected respectively with a top and a bottom of the lid 2. Each pivotal arm 3 has a first end securely connected with the lid 2 and a second end pivotally connected with the casing 1 by a pin 30.

The first lever 4 is mounted below the bottom board 12 of the casing 1 and has a first end and a second end. The first end of the first lever 4 is pivotally connected with a bent segment of the pivotal arm 3 that is connected to the bottom of the lid 2. The second end of the first lever 4 is provided with a pushing block 5. The pushing block 5 is mounted slidably through the rail channel 121, extends inside the casing 1, and is selectively held in the recess 142 in the casing 1. Preferably, the pushing block 5 may be cylindrical, or a column in an oval, polygonal or any possible geometrical shaped cross section.

In use, with reference to FIGS. 1 to 3A, when the lid 2 is opened relative to the casing 1, the first lever 4 will be pulled toward the open end 13 of the casing 1 by the pivotal arm 3 to which the first lever 4 is connected. Consequently, the pushing block 5 will be moved along the rail channel 121. Accordingly, a hard disk drive can be put into the casing 1 via the open end 13. While the hard disk drive 6 is put into the casing 1, one end of the hard disk drive 6 will push the pushing block 5 to move toward the closed end 14 of the casing 1 along the rail channel 121. When the lid 2 is closed relative to the casing 1, the lid 2 will push against the hard disk drive 6 until the pushing block 5 is held inside the recess 142 in the closed end 14. At this time, the plug 61 on the hard disk drive 6 will engage with the socket 141 in the closed end 14. The locking member 21 on the lid 2 will engage with the locking hole 11 in the casing 1 to keep the lid 2 at the closed position for closing the open end 13 of the casing 1. At this time, the resilient member 22 abuts against the hard disk drive 6 to generate a resilient force. To open the lid 2, the locking member 21 is disengaged from the locking hole 11, the resilient force of the resilient member 22 will push the lid 2 to pivot relative to the casing 1 for opening the open end 13. Consequently, the first lever 4 is pulled by the pivotal arm 3 to which the first lever 4 is connected, and the pushing block 5 is moved toward the open end 13 of the casing 1 along the rail channel 121. Thus, the plug 61 on the hard disk drive 6 is disengaged from the socket 141, and the hard disk drive 6 is automatically pushed to extend out of the casing 1 from the open end 13. Accordingly, the hard disk drive 6 can be drawn from the casing 1 easily and conveniently.

Figure 6:
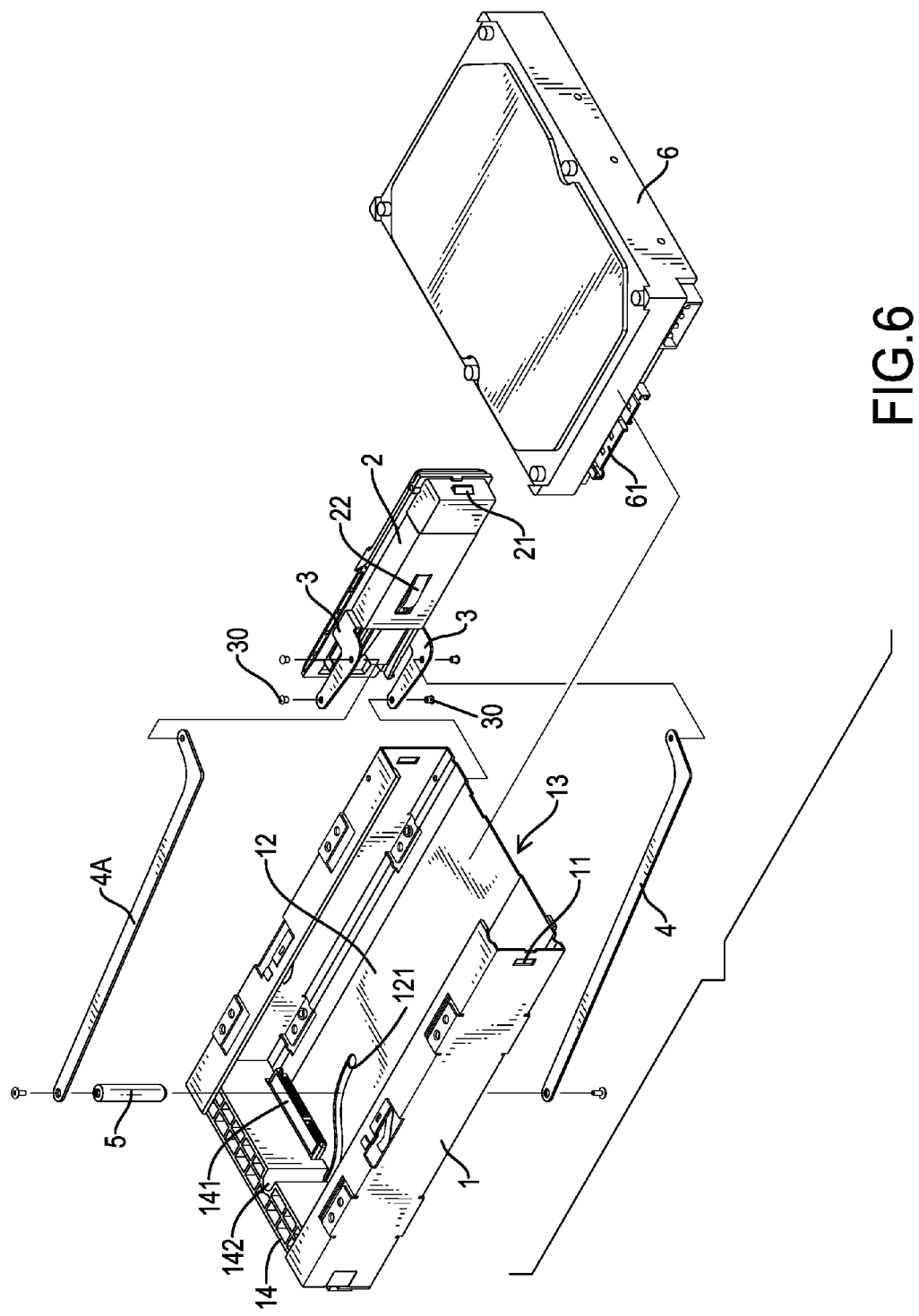
FIG. 6 is an exploded perspective view of a hard disk drive and a second embodiment of a hard disk drive tray in accordance with the present invention.
Figure 7:
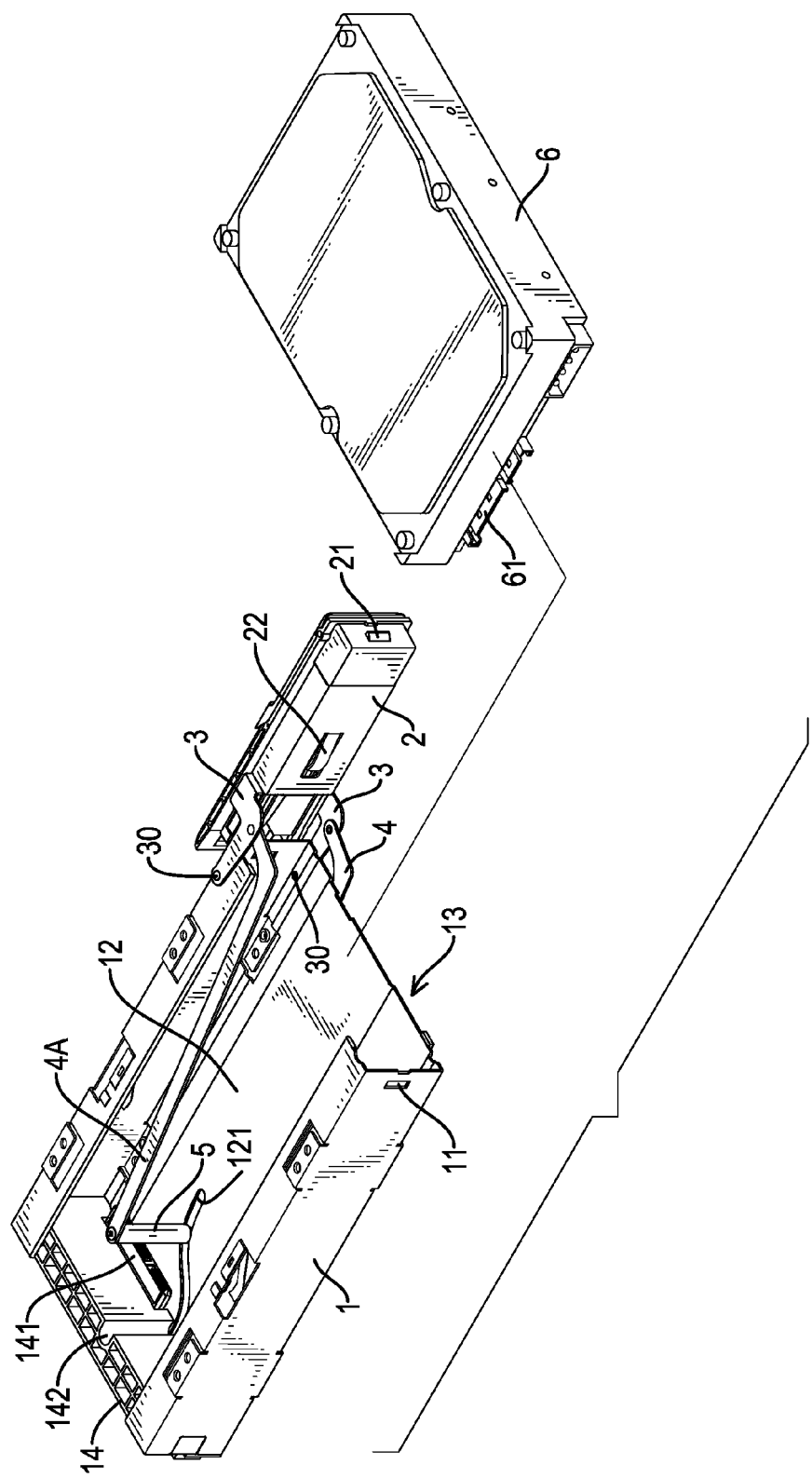
FIG. 7 is an exploded perspective view of the hard disk drive and the hard disk drive tray in FIG. 6.

With reference to FIGS. 6 and 7, the hard disk drive tray further comprises a second lever 4. The second lever 4A has a first end and a second end. The first end of the second lever 4A is pivotally connected with the pivotal arm 3 that is connected to the top of the lid 2. The second end of the second lever 4A is connected with the pushing block 5 on the first lever 4.

With such an arrangement, when the lid 2 is opened relative to the casing 1, the levers 4,4A are pulled respectively by the pivotal arms 3. The pushing block 5 is moved along the rail channel 121 to automatically push the hard disk drive 6 to extend out of the open end 13 of the casing 1. Accordingly, the hard disk drive tray in accordance with the present invention has a simplified structure and is time-saving in assembling. In addition, because the pushing block 5 is moved along the rail channel 121, the movements of the pushing block 5 and the levers 4,4A are stable. Thus, the operation of the hard disk drive tray in accordance with the present invention is labor-saving and stable.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hard disk drive tray comprising:
   a casing for holding a hard disk drive inside and comprising
      a bottom board;
      a side;
      an open end;
      a closed end opposite the open end;
      a recess defined in the closed end at a side of the closed end facing the open end;
      a locking hole defined in the side of the casing at a position near the open end;
      a socket mounted on the closed end for being connected with a plug on the hard disk drive; and
      a rail channel defined through the bottom board and having an end communicating with the recess;
   a lid pivotally connected with and closing the open end of the casing and having a locking member mounted on the lid and selectively engaging with the locking hole in the casing; and
   a resilient member mounted on a side of the lid to be adapted to abut with the hard disk drive when the open end is closed by the lid;
   two pivotal arms being bent and connected respectively with a top and a bottom of the lid, and each pivotal arm having a first end securely connected with the lid and a second end pivotally connected with the casing; and
   a first lever mounted below the bottom board of the casing and having a first end pivotally connected with the pivotal arm that is connected to the bottom of the lid and a second end provided with a pushing block that is mounted slidably through the rail channel, extends inside the casing, and is selectively held in the recess in the casing.

2. The hard disk drive tray as claimed in claim 1, wherein the hard disk drive tray further comprises a second lever having a first end pivotally connected with the pivotal arm that is connected to the top of the lid and a second end connected with the pushing block on the first lever.

3. The hard disk drive tray as claimed in claim 2, wherein the rail channel extends from the closed end toward a middle segment of the bottom board.

4. The hard disk drive tray as claimed in claim 3, wherein the rail channel is curved.

5. The hard disk drive tray as claimed in claim 4, wherein the pushing block is cylindrical.

6. The hard disk drive tray as claimed in claim 1, wherein the rail channel extends from the closed end toward a middle segment of the bottom board.

7. The hard disk drive tray as claimed in claim 6, wherein the rail channel is curved.

8. The hard disk drive tray as claimed in claim 7, wherein the pushing block is cylindrical.

9. The hard disk drive tray as claimed in claim 1, wherein the rail channel is curved.

10. The hard disk drive tray as claimed in claim 9, wherein the pushing block is cylindrical.

11. The hard disk drive tray as claimed in claim 1, wherein the pushing block is cylindrical.

* * * * *